(12) United States Patent
Schaffer

(10) Patent No.: US 9,222,504 B2
(45) Date of Patent: Dec. 29, 2015

(54) WASHER WITH COLLAPSIBLE PROTRUSIONS FOR ACCOMMODATING PIVOT GAP MATERIAL THICKNESS

(71) Applicant: BAE Industries, Inc., Warren, MI (US)

(72) Inventor: Kristopher G. Schaffer, Chesterfield Township, MI (US)

(73) Assignee: BAE Industries, Inc., Warren, MI (US)

( * ) Notice: Subject to any disclaimer, the term of this patent is extended or adjusted under 35 U.S.C. 154(b) by 332 days.

(21) Appl. No.: 13/763,488

(22) Filed: Feb. 8, 2013

(65) Prior Publication Data

US 2013/0209161 A1 Aug. 15, 2013

Related U.S. Application Data

(60) Provisional application No. 61/597,020, filed on Feb. 9, 2012.

(51) Int. Cl.
| | |
|---|---|
| *F16D 1/12* | (2006.01) |
| *F16C 11/04* | (2006.01) |
| *B60N 2/44* | (2006.01) |
| *F16C 25/04* | (2006.01) |
| *F16B 43/00* | (2006.01) |

(52) U.S. Cl.
CPC .............. *F16C 11/04* (2013.01); *B60N 2/4435* (2013.01); *F16C 25/04* (2013.01); *B60N 2205/20* (2013.01); *E05Y 2600/636* (2013.01); *E05Y 2800/33* (2013.01); *E05Y 2800/344* (2013.01); *F16B 43/00* (2013.01); *F16C 2326/08* (2013.01); *Y10T 403/32* (2015.01); *Y10T 403/32819* (2015.01)

(58) Field of Classification Search
CPC ...................... Y10T 403/32; Y10T 403/32819; E05Y 2600/636; E05Y 2800/33; E05Y 2800/344; F16C 11/04; F16C 25/04; F16C 2326/08; F16B 43/00; B60N 2/4435; B60N 2205/20
USPC .............. 403/52, 70–72, 145, 408.1; 411/544
See application file for complete search history.

(56) References Cited

U.S. PATENT DOCUMENTS

| | | | | |
|---|---|---|---|---|
| 1,686,300 | A | * | 10/1928 | Vollrath .............................. 24/37 |
| 2,069,402 | A | * | 2/1937 | Cowlin ......................... 411/154 |
| 2,179,575 | A | * | 11/1939 | Hosking ........................ 411/162 |
| 3,906,567 | A | | 9/1975 | Barth et al. |
| 4,067,184 | A | * | 1/1978 | Johnson, Jr. .................... 57/135 |
| 4,131,050 | A | | 12/1978 | Holmes |
| 4,257,465 | A | * | 3/1981 | Berg ............................. 411/147 |
| 4,435,112 | A | | 3/1984 | Becker |
| 4,757,661 | A | | 7/1988 | Hasan |

(Continued)

*Primary Examiner* — Gregory Binda
*Assistant Examiner* — Nahid Amiri
(74) *Attorney, Agent, or Firm* — Dinsmore & Shohl LLP; Douglas J. McEvoy

(57) ABSTRACT

A deformable washer incorporated into a pivot assembly including a support sector and a rotatable sector pivotally mounted to the support sector by aligning apertures in the sectors which receive a widthwise inserting pin. The washer includes a disk shaped body defining an open interior and such that the body is supported by the pin in a desired sandwiching arrangement between the sectors. Protrusions extend from either or both of first and second annular extending faces of the body exhibiting deformable characteristics such that, a laterally applied compressive force associated with the stacking assembly results in collapse of the protrusions without otherwise affecting the structural integrity of the underlying body and allows for variations in material thickness resulting in a lateral gap at the pivot while reducing instances of lateral play.

9 Claims, 5 Drawing Sheets

(56) References Cited

U.S. PATENT DOCUMENTS

| | | | |
|---|---|---|---|
| 5,072,917 A * | 12/1991 | Pleva | 267/162 |
| 5,547,408 A | 8/1996 | Skyman | |
| 5,667,347 A * | 9/1997 | Matthews | 411/150 |
| 5,687,453 A * | 11/1997 | Megregian et al. | 16/221 |
| 5,851,151 A | 12/1998 | Reynolds | |
| 6,073,933 A | 6/2000 | Johnston | |
| 6,082,942 A * | 7/2000 | Swick | 411/368 |
| 7,523,912 B1 * | 4/2009 | Woods | 248/415 |
| 7,575,390 B2 | 8/2009 | Yanagita | |
| 7,708,512 B2 | 5/2010 | McLean et al. | |
| 7,850,243 B2 * | 12/2010 | Sakamoto | 297/362 |
| 8,028,419 B2 * | 10/2011 | VanHoy | 30/161 |
| 2009/0110510 A1 | 4/2009 | Cairo et al. | |
| 2011/0169313 A1 * | 7/2011 | Schulz et al. | 297/362 |
| 2011/0306911 A1 * | 12/2011 | Tran | 602/16 |

* cited by examiner

WASHER WITH COLLAPSIBLE PROTRUSIONS FOR ACCOMMODATING PIVOT GAP MATERIAL THICKNESS

CROSS REFERENCE TO RELATED APPLICATIONS

The present application claims the priority of U.S. Ser. No. 61/597,020 filed Feb. 9, 2012.

FIELD OF THE INVENTION

The present invention discloses a washer design, such as can be incorporated into a hinged latch assembly, and which exhibits circumferentially spaced apart, extending and collapsible protrusions located on at least one of first and second faces of the washer. In use the protrusions are caused to collapse upon assembly of the stackable components associated with the hinged or pivot assembly in a manner, and which allows for variations in material thickness typically resulting in a maximum lateral gap at a main pivot location thereby reducing or eliminating instances of lateral play.

BACKGROUND OF THE RELEVANT ART

The prior art is documented was varying types of fastener assemblies, such including flat and irregular cross sectional profile (such as spring) washers which are employed in a stacked coaxial arrangement. An example of a washer incorporating protrusions for use in a fastener assembly is set forth in US 2009/0110510, to Cairo et al., and in which a body has a first face, a second face and an aperture extending through the body between the first and second faces. A plurality of protrusions extend from at least one of the first and second faces and which exhibit sufficient structural integrity to create a plurality of corresponding deformations in a separate mating surface during compressive loading of the washer against the separate mating surface.

SUMMARY OF THE PRESENT INVENTION

The present invention discloses a washer incorporated into a pivot assembly including at least one support sector and a rotatable sector pivotally mounted to the support sector by aligning apertures in the sectors which receive a widthwise inserting pin. The washer includes a disk shaped body with both outer and inner perimeter extending edges defining an open interior and such that the body is stackingly supported by the pin in a desired sandwiching arrangement between the sectors.

At least one plurality of protrusions extend from at least one of first and second annular extending side faces of the body. According to one desired and non-limiting arrangement, the protrusions exhibit deformable characteristics such that, upon exhibiting a laterally compressive force associated with the stacking assembly, result in collapse of the protrusions without otherwise affecting the structural integrity of the underlying body and allowing for variations in material thickness resulting in a lateral gap at the pivot while reducing instances of lateral play.

Other features include the first and second pluralities of protrusions being arranged in at least one of circumferentially and/or radially offset fashion along each of the first and second annular faces. Each of the protrusions may further incorporate a generally stubbed cylindrical shape including a flattened elevated top surface. The washer body and/or protrusions may also be constructed of any of a plasticized material, a deformable metal or a composite material.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As previously described, the present invention discloses a washer design, such as a plastic washer incorporated into a hinged latch assembly, and which exhibits circumferentially spaced apart, extending and collapsible protrusions located on at least one of first and second faces of the washer. In use the protrusions are caused to collapse upon assembly of the stackable components associated with the hinged or pivot assembly in a manner, this in practice allowing for variations in material thickness typically resulting in a maximum lateral gap at a main pivot location, thereby reducing or eliminating instances of lateral play.

Figure 1:
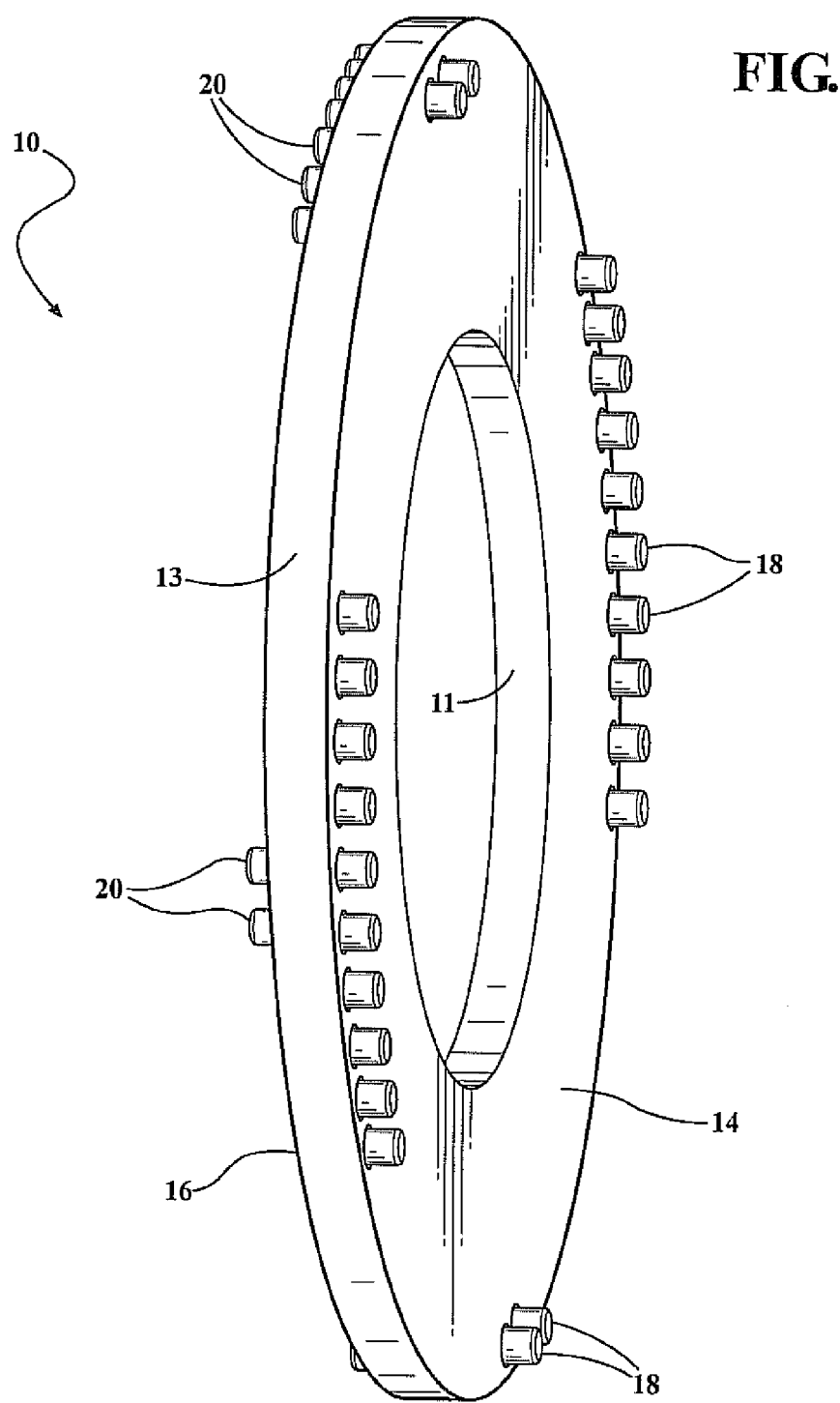
FIG. 1 is a side disposed perspective of the washer according to one non-limiting preferred embodiment and which depicts irregular patterns of protrusions arranged on both first and second annular faces, the protrusions each exhibiting a stubbed cylindrical shape and, in the non-limiting variant depicted, being arranged in similar and circumferentially offset patterns between the two faces, this in order to facilitate even compression during controlled collapse.

Referring first to FIG. 1, a side disposed perspective is generally shown at 10 of a washer according to one non-limiting preferred embodiment and which includes a generally disk shaped body with a hollow interior, established by inner perimeter edge 11, such as which is dimensioned for receiving a crosswise inserting main pin 12 (see FIG. 5) and so that the washer 10 is provided within a generally stacking arrangement of a main pivot assembly or the like.

As shown, pluralities of protrusions are provided in any desired regular or irregular pattern along either or both of first 14 and second 16 annular faces of the washer which are bounded by the inner rim 11 and a further outer perimeter rim 13 of the washer 10. The protrusions are depicted in the non-limiting illustrations by a first plurality 18 of protrusions applied along the first face 14 and second plurality 20 of protrusions applied along the second face 16.

Figure 2:
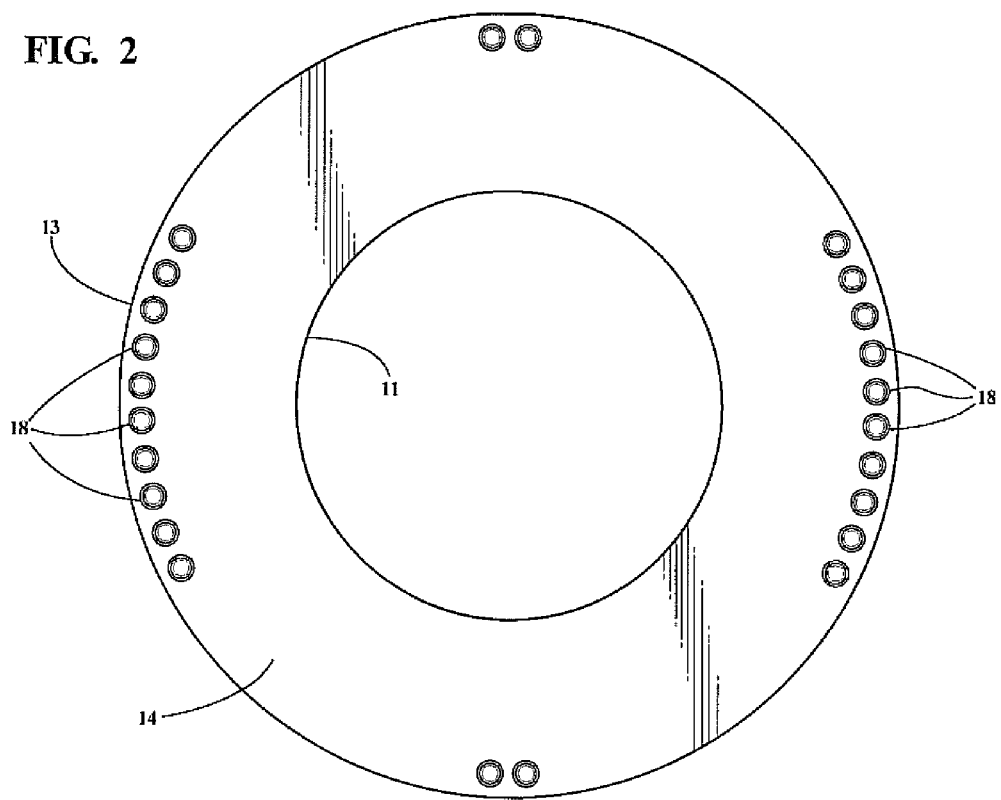
FIG. 2 is a front plan view of the washer in FIG. 1.
Figure 3:
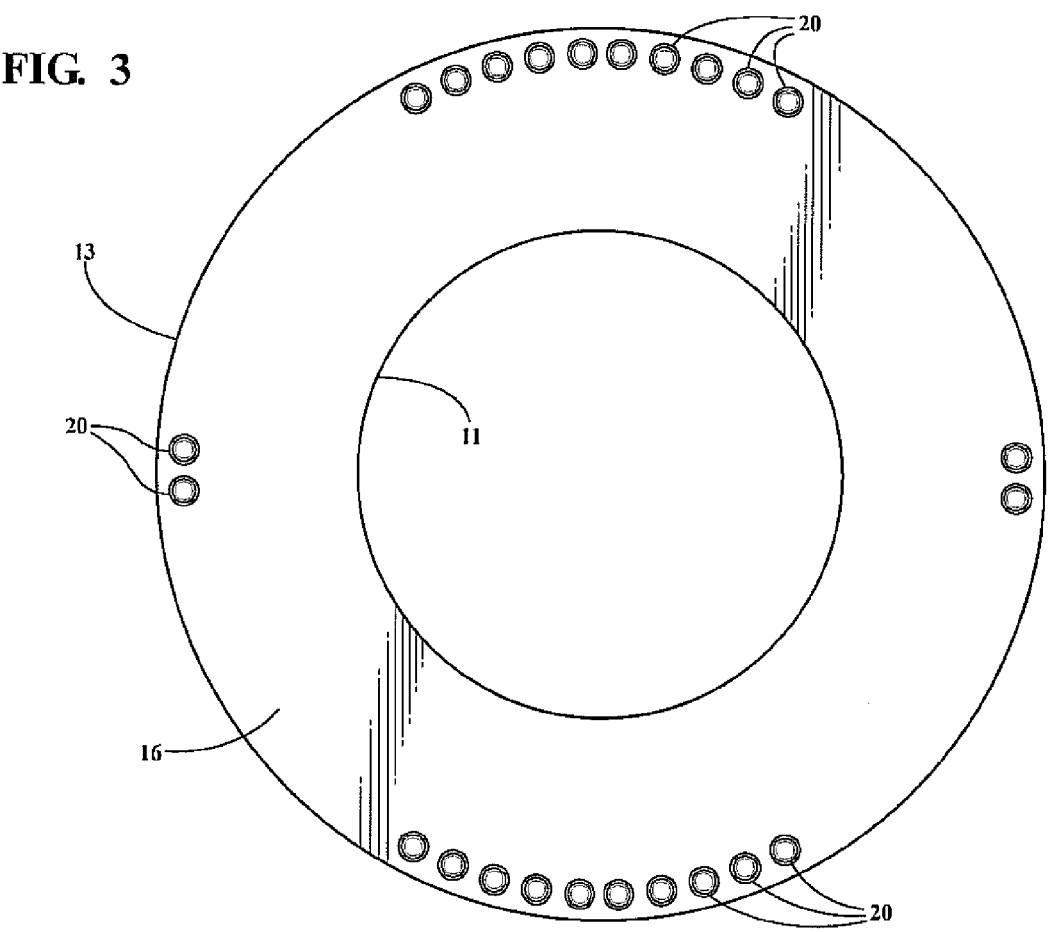
FIG. 3 is a rotated rear plan view.
Figure 4:
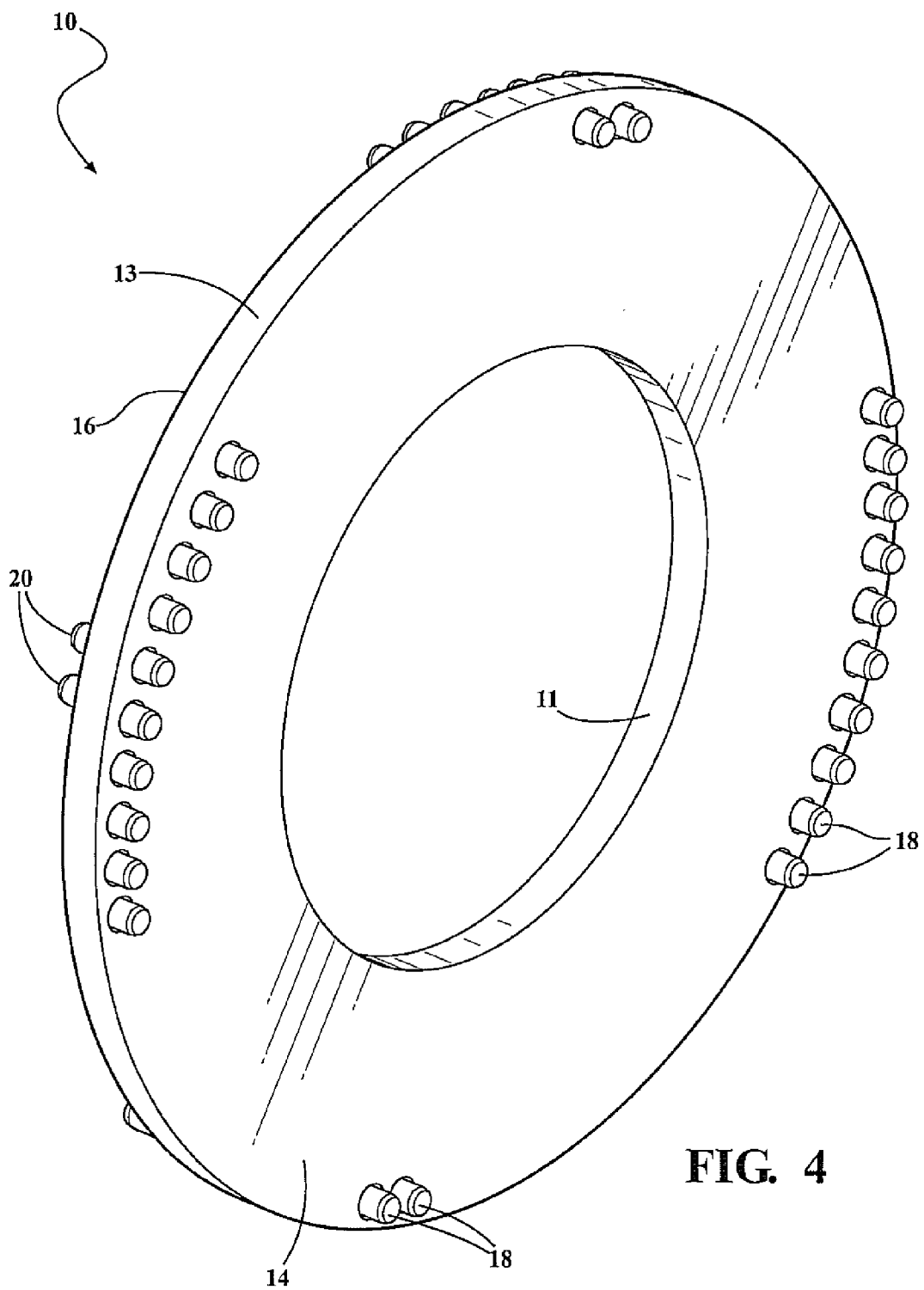
FIG. 4 is a perspective line art view of the washer depicting the circumferential arrangement of the protrusions on both first and second faces of the washer.

As depicted, each protrusion 18 and 20 exhibits a stubbed cylindrical shape with a flattened elevated top surface and, in the non-limiting variant depicted, are arranged in similar and circumferentially offset patterns between the two faces 14 and 16 as additionally shown in succeeding views FIGS. 2-4. In this fashion, the protrusions 18 and 20, which are usually constructed from a similar deformable plastic, metallic or composite material as the body of the washer 10, are caused to compress/collapse by virtue of the lateral forces associated with the assembly of the sectors in establishing the stacking arrangement of FIG. 5.

Figure 5:
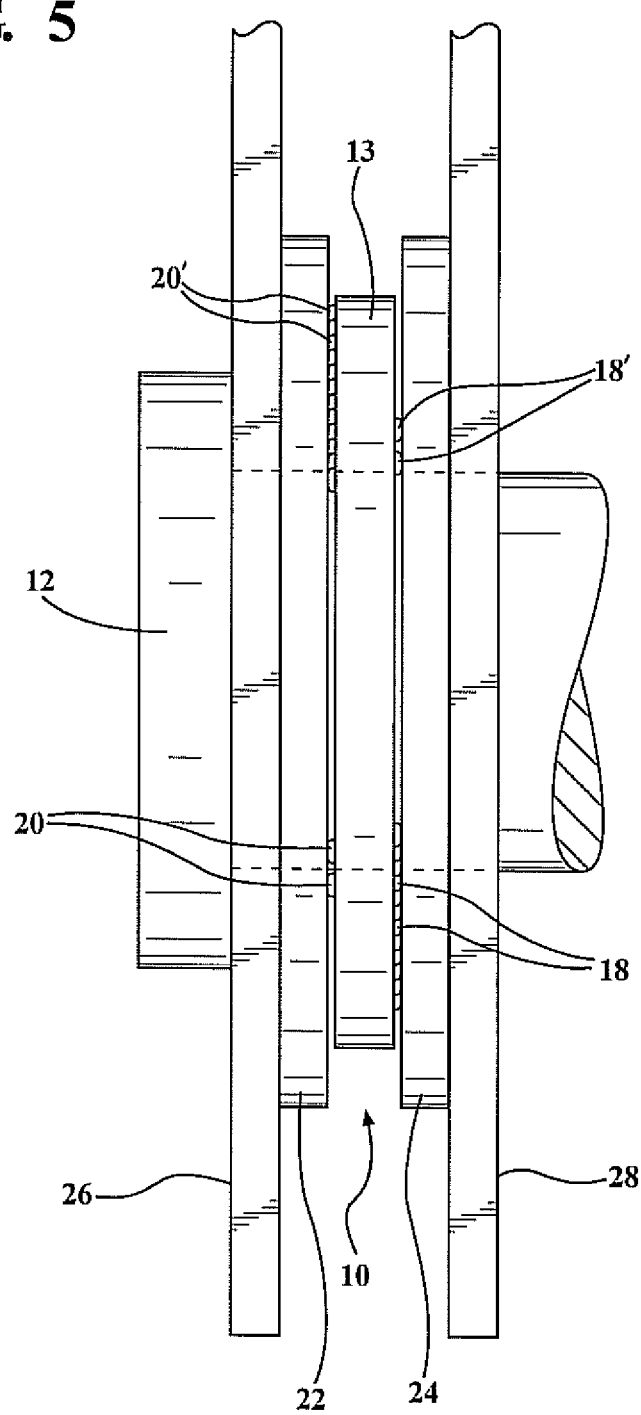
FIG. 5 is a side view of an exemplary and non-limiting example of a stacking arrangement in which the collapsible aspects of the washer are evident in combination with additional elements such as rotating sectors and outer support plates associated with a main pivot assembly incorporating the sectors, washer and pin.

As again shown in FIG. 5, this collapsing effect is further depicted in exemplary fashion a pair of sectors 22 and 24 in a typical but non-limiting arrangement relative to the washer 10, and which are further sandwiched between a pair of (fixed) outer supports 26 and 28 in pivotally associated fashion by the pin 12 inserting widthwise through the aligning apertures in washer and sectors.

In operation, any material and dimensional inconsistencies resulting in either misalignments or existence of a maximum gap at a main pivot interface are compensated for by the construction of the deformable washer, and in which the protrusions are caused to deformably collapse and flatten (see at 18' and 20' in FIG. 5) in a manner which fills any areas of maximum gap existing at either interface between the washer 10 and the opposing sectors 22/24 or surfaces of the outer supports 26/28.

Also, and beyond the single washer 10 depicted in FIG. 5, it is understood that any number of washers can be integrated into a main pivot or other assembly, such as in which identically configured washers with collapsible protrusions can be stacked in proximity to both inner and/or outer sectors of the pivot assembly. It is also envisioned that any number of rigid and non-collapsible washers can be utilized along with any subset number of washers such as those depicted herein with collapsible protrusions defined thereupon.

It is further envisioned that the washer body can be constructed from any suitable material, such as the same or different than the surface disposed protrusions (this contemplating any of meal, plastic, composite or other type materials exhibiting any controlled deformation aspects) and, along with an arrangement of deformable protrusions located on either or both of first and second annular faces of the washer, and which is designed in part to provide any required degree of gap/misalignment compensation in order to overcome lateral play issues associated with an associated pivot assembly.

It is further envisioned that the respective pluralities of protrusions 18 and 20 can be defined in additional patterns or configurations, such as beyond that shown in which a pair of closely spaced protrusions on a selected side face are segregated from a larger plurality of like protrusions at circumferentially offset locations (such as averaging ninety degrees from a center point location of the larger plurality) and relative to a corresponding center point location of the pair of offset protrusions.

Additional variations can include the protrusions being arranged in equidistant circumferentially spaced fashion around the outer facing sides of the washer. The protrusions can further be redesigned along the faces of the washer between its outer perimeter and inner aperture defining perimeter edges such that the protrusions can be staggered or otherwise offset in either or both circumferential and radial fashion as desired in order to compensate for further gap defining misalignment or lateral play issues involved with any hinged or pivot assembly as well as to promote any desired collapsing profile of the compressed protrusions in order to compensate for irregularities in the pivotally stacked sectors and fixed supports.

Other variations can include the protrusions 18 and 20 exhibiting different shapes or profiles not limited to that depicted (such including potentially angled outer extending, convex or concave top edges, as well as non-cylindrical and irregular shaped perimeter extending profiles). In this fashion, the configuration of the collapsed protrusions can be further modified as desired to compensate for either or both material and dimensional inconsistencies associated with the pivot assembly.

Having described my invention, other additional preferred embodiments will become apparent to those skilled in the art to which it pertains and without deviating from the scope of the appended claims.

I claim:

1. A washer incorporated into a pivot assembly including a support sector and a rotatable sector pivotally mounted to the support sector by aligning apertures in the sectors which receive a widthwise inserting pin, said washer comprising:
   a disk shaped body defining an open interior and supported by the pin between the sectors; and
   first and second pluralities of protrusions extending from each of first and second annular faces of said body and which are arranged in either of circumferentially or radially offset and uneven grouped fashion, said protrusions exhibiting deformable characteristics which, upon application of laterally compressive forces associated with assembling the sectors, results in collapsing of said protrusions in order to reduce instances of lateral play between the sectors and body while allowing for variations in material thickness between the sectors.

2. The washer as described in claim 1, each of said protrusions further comprising a generally stubbed cylindrical shape including a flattened elevated top surface.

3. The washer as described in claim 1, further comprising said protrusions being constructed of a plasticized material.

4. The washer as described in claim 1, said protrusions being integrally formed upon said body and being constructed of any of plasticized, deformable metallic or composite materials.

5. A pivot assembly, comprising:
   a pair of fixed outer support sectors;
   a pair of inner rotatable sectors pivotally mounted to between said outer support sectors by aligning apertures in said pairs of sectors which receive a widthwise inserting pin;
   a washer having a disk shaped body defining an open interior and supported by said pin between said inner pair of rotatable sectors; and
   protrusions extending from each of first and second annular faces of said body, said protrusions being arranged in a grouped fashion upon said annular faces and exhibiting deformable characteristics which, upon application of laterally compressive forces associated with assembling the sectors, results in collapsing of said protrusions in order to reduce instances of lateral play between the sectors and body while allowing for variations in material thickness between said sectors.

6. The assembly as described in claim 5, further comprising first and second pluralities of said protrusions arranged in any of circumferentially or radially offset fashion along each of said annular faces.

7. The assembly as described in claim 5, each of said protrusions further comprising a generally stubbed cylindrical shape including a flattened elevated top surface.

8. The assembly as described in claim 5, further comprising said protrusions being constructed of a plasticized material.

9. The assembly as described in claim 5, said protrusions being integrally formed upon said body and being constructed of any of plasticized, deformable metallic or composite materials.

* * * * *